Jan. 17, 1950   L. D. JENNINGS ET AL   2,495,169
DRIVE SHAFT
Filed April 22, 1946
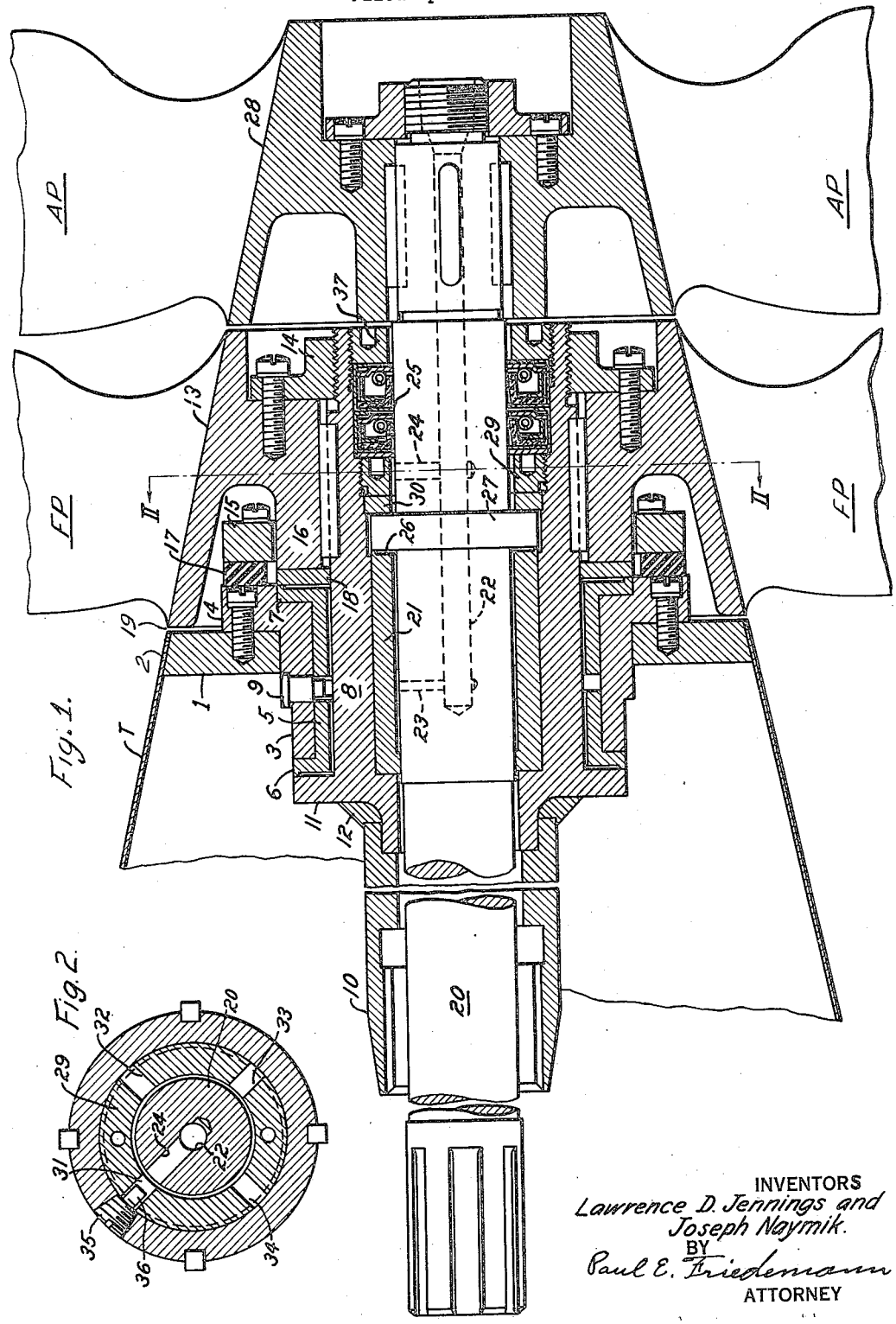
INVENTORS
Lawrence D. Jennings and
Joseph Naymik.
BY
Paul E. Friedemann
ATTORNEY Patented Jan. 17, 1950

2,495,169

UNITED STATES PATENT OFFICE 2,495,169

DRIVE SHAFT

Lawrence D. Jennings and Joseph Naymik, Sharon, Pa., assignors to Westinghouse Electric Corporation, East Pittsburgh, Pa., a corporation of Pennsylvania Application April 22, 1946, Serial No. 664,051

3 Claims. (Cl. 114—20)

Our invention relates to drive shafts and more particularly to a shaft assembly of a plurality of concentric shafts.

A particular application of our invention is in conjunction with the propulsion shafts of a torpedo. For this type of use the shaft assembly consists of the forward propeller drive shaft and the bearing housings and their assembly.

With the torpedoes now in use the tailcone is designed to admit sea water. A differential gear is mounted in the tailcone to provide the opposite rotation of the two concentric shafts coupled to the two propellers disposed in tandem at the aft end of the tailcone. In this arrangement water is used as a lubricant for the differential gear as well as the shaft bearings disposed aft of the differential gear. The limitations of water as a lubricant are well known. Further, there is a considerable loss of propulsive power by reason of the churning of the water in the tailcone.

One broad object of our invention is the provision of a plurality of concentric shafts with the innermost shaft disposed in a bearing in the first outer shaft, the first outer shaft disposed in a bearing in the second outer shaft, etc.

Another object of our invention is the provision of liquid-tight bearings for a plurality of concentric shafts, the bearings being designed to take any end thrust applied to the ends of the shaft.

It is also an object of our invention to provide a sleeve bearing in a base designed to snugly receive a hollow shaft and designed to receive the end thrust applied to the hollow shaft, a second sleeve bearing in the hollow shaft concentric of the first sleeve bearing and designed to receive the end thrust of a shaft disposed snugly in the second sleeve bearing.

A broad object of our invention is the provision of a bearing assembly and shaft assembly, substantially as hereinafter disclosed.

The objects recited are merely illustrative. Other objects and advantages will become more apparent from a study of the following specification and the accompanying drawing, in which:

Figure 1 is a longitudinal sectional view of our invention; and

Fig. 2 is a transverse sectional view of a portion, namely a detail of our invention, the section being on the section line II—II of Fig. 1.

In Fig. 1, T designates the tailcone of a torpedo. The aft end of the tailcone is provided with an inwardly directed annular flange 1 welded to the tailcone at 2 to provide a hermetic seal between the flange and tailcone. An annular member 3 having the outwardly directed flange 4 is bolted to the flange 1. This member 3 is made of hot rolled steel and is concentrically bored and receives press fitted the two halves of a bronze bearing forming the bearing bushing 5.

The bearing bushing 5 is provided with radially directed flanges 6 and 7 at the forward and aft ends, respectively. The cylindrical inner surface is bored to snugly fit the outer cylindrical surface of the hollow shaft 8. The bearing bushing 5 is provided with spaces adjacent shaft 8 for the lubricant that is disposed between the shaft 8 and bearing bushing 5. The radially directed flanges 6 and 7 are provided, as shown, with a plurality of radially directed grooves in communication with the spaces in the bushing 5. Lubricant is thus readily transmitted to the radial thrust receiving surfaces on these flanges 6 and 7. Grease for lubrication is admitted under high pressure to the grease grooves or spaces through the filling 9.

The shaft 8 constitutes the drive shaft for the forward propellers FP of a torpedo. The shaft 8 is made of two pieces 10 and 11 welded together at 12. The forward piece 10 is made of a piece of hot-rolled steel tubing and the aft piece 11 is made of a piece of hot-rolled steel bar. After welding the two pieces together the outside and inside are concentrically machined and the forward end of piece 10 is provided with an inside spline, as shown, for connection to the propulsion motor.

The entire length of the outside surface of piece 11 up to the threaded aft end is chromeplated to provide a good hard bearing surface as well as for protection against sea water corrosion. The aft end of shaft 8 has four keys spaced at 90° about the shaft. The keys engage the propeller hub 13 to which the forward propellers FP are secured. A propeller lock-nut 14 engages the threaded aft end of shaft 8 and is bolted as shown to the propeller hub 13.

The hub 13 has an annular recess in the forward surface as shown. A ring 15 is disposed in the recess. This ring 15 is disposed in close but spaced relation to the thrust transmitting portion 16 of the hub 13. A neoprene gasket 17 is disposed between the ring 15 and the flange 4. The ring 15 is bolted to the flange 4 and thus firmly holds the neoprene gasket in position with reference to the flange 4 and ring 15. This assembly thus provides a grease seal to prevent loss of grease at the radial surface of flange 7 engaging the stainless steel thrust ring 18. This stainless steel thrust ring 18 keeps the thrust transmitting portion 16 of the bronze hub 13 out of contact of the bronze bearing 5. All the thrust of hub 13 is thus transmitted through the thrust ring 18 to the radial flange 7 of the bearing 5. The grease under high pressure between bearing 5 and shaft 8 and the grease seal including the gasket 17 and ring 15 thus prevent any sea water entering at 19 from entering the tailcone.

The drive shaft 20 is turned down smooth with the forward end externally splined to be coupled to the propulsion motor for the torpedo. The central portion is recessed, and the aft region engaging the bronze bearing 21 and up to its threaded aft end is chrome-plated and ground smooth for a good hard bearing surface, as well as for protection against sea water corrosion.

The shaft is provided with an axial hole 22 open at the aft end. A pair of radially directed channels 23 and 24 leading to the outer surface of the shaft communicate with the hole 22. The aft end is provided with a grease fitting so that the hole 22 and channels 23 and 24 may transmit lubricant, as a relatively heavy water resistant grease, to the bearing 21 and grease seals 25.

The bronze bearing 21 is press-fitted into shaft 8 and fits snugly about the chrome-plated outer surface of shaft 20. The bearing 21 is suitably grooved for receiving the lubricant, and has a plurality of radially directed grease grooves in the radial surface 26 of the bearing 21.

The shaft 20 is provided with a thrust ring 27 which may be either integral with the shaft 20 or shrunk-fit onto shaft 20. All the forwardly directed end thrust on shaft 20 from the aft propellers AP secured to the bronze hub 28 is thus transmitted by the ring 27 to the radial surface 26 of the bearing 21.

A suitable lock-nut 29 is threaded into the shaft 8. This lock-nut holds a thrust ring 30 against a shoulder at the inner surface of shaft 8. Any thrust on shaft 20 in the aft direction is thus received by the ring 30. The lock-nut is provided with four radial holes 31, 32, 33 and 34 spaced at 90°. An externally threaded screw 35 having the projection 36 is filled into a radial opening in shaft 8. The projection 36 locks the nut 29 in fixed relation to the shaft 8. The openings in shaft 8, nut 29, thus provide for cleaning the channel 24 without having to disassemble the parts.

Suitable grease seals 25 of well known construction are disposed about shaft 20 and are held in place by the externally threaded nut 37 disposed in the internally aft end of shaft 8.

While we have shown and described but one embodiment of our invention, we are aware that others, particularly after having had the benefit of the teachings of our invention, may devise apparatus for the same general purpose and having the same general function. We, therefore, do not wish to be limited to the exact showing made but wish to be limited only by the scope of the claims hereto appended.

We claim as our invention:

1. In the propulsion equipment for a torpedo, in combination, a torpedo tailcone provided with an inwardly directed bulkhead, a sleeve bearing axially disposed of the bulkhead, said sleeve bearing at the aft end thereof being provided with a flat radially directed thrust receiving surface, a sleeve shaft fitting into the sleeve bearing, a propeller hub secured to the aft end of the sleeve shaft, a propeller on said hub, said hub having a thrust transmitting sleeve disposed in facing relation to the radially directed surface, grease channels in the radial and sleeve portion of the sleeve bearing, means within the tailcone of the torpedo for supplying grease to said channels, a second sleeve bearing fixed within the sleeve shaft, said second sleeve bearing having a radially directed thrust receiving surface at the aft end; a shaft in the second sleeve bearing, said second shaft being provided with a shoulder contiguous to the thrust receiving surface on the second sleeve bearing, a propeller hub at the aft end of the second shaft, a propeller on said last named hub, whereby the forward propeller thrust on the hub on the second shaft is transmitted to the sleeve bearing in the first shaft and the total thrust of both hubs is transmitted to the sleeve bearing in the bulkhead.

2. In the propulsion equipment for a torpedo, in combination, a torpedo tailcone provided with an inwardly directed bulkhead, a sleeve bearing axially disposed of the bulkhead, said sleeve bearing at the aft end thereof being provided with a flat radially directed thrust receiving surface, a sleeve shaft fitting into the sleeve bearing, a propeller hub secured to the aft end of the shaft, a propeller mounted on the hub, said hub having a thrust transmitting sleeve disposed in facing relation to the radially directed surface, a thrust transmitting ring between the radially directed surface and sleeve on the hub, said sleeve bearing being provided with communicating grease channels in the sleeve portion and radial thrust portion, means within the tailcone for supplying grease to said channels.

3. In the propulsion equipment for a torpedo, in combination, a torpedo tailcone provided with an inwardly directed bulkhead, a sleeve bearing axially disposed of the bulkhead, said sleeve bearing at the aft end thereof being provided with a flat radially directed thrust receiving surface, a sleeve shaft fitting into the sleeve bearing, a propeller hub secured to the aft end of the shaft, a propeller on said hub, said hub having a thrust transmitting sleeve disposed in facing relation to the radially directed surface, a thrust transmitting ring between the radially directed surface and thrust transmitting sleeve on the hub, a grease seal connected to the bulkhead and disposed in the axial direction to surround the thrust transmitting sleeve on the hub, said sleeve bearing being provided with communicating grease channels in the sleeve portion and radial thrust portion, means within the tailcone for supplying grease to said channels, a second sleeve bearing fixed within the sleeve shaft, said second sleeve bearing having a radially directed thrust receiving surface at the aft end, a shaft in the second sleeve bearing, said second shaft being provided with a shoulder contiguous to the thrust receiving surface on the second sleeve bearing, a propeller hub at the aft end of the second shaft, a propeller on said last named hub, whereby the forward propeller thrust on the hub on the second shaft is transmitted to the sleeve bearing in the first shaft and the total thrust of both hubs is transmitted to the sleeve bearing in the bulkhead, said second sleeve bearing being provided with communicating grease channels in the cylindrical and radial surfaces, and said last named shaft being provided with internal channels for supplying grease to the grease channels in the second sleeve shaft, and means at the aft end of the last named shaft for supplying grease to the second sleeve bearing.

LAWRENCE D. JENNINGS.
JOSEPH NAYMIK.

REFERENCES CITED

The following references are of record in the file of this patent:

UNITED STATES PATENTS

| Number | Name | Date |
|---|---|---|
| 1,459,454 | Trotter | June 19, 1923 |
| 1,688,761 | Sperry | Oct. 23, 1928 |
| 2,030,232 | Stone | Feb. 11, 1936 |
| 2,210,731 | Ritter | Aug. 6, 1940 |
| 2,414,928 | Chilton | Jan. 28, 1947 |